Sept. 23, 1958 R. K. TAYLOR 2,853,366
PROCESS OF RECOVERING HYDRAZINE FROM A LIQUID MIXTURE
OF HYDRAZINE, AMMONIA AND AMMONIUM CHLORIDE
Filed Aug. 30, 1955
PHASE DIAGRAM FOR THE SYSTEM: $NH_3 - N_2H_4 - NH_4Cl$
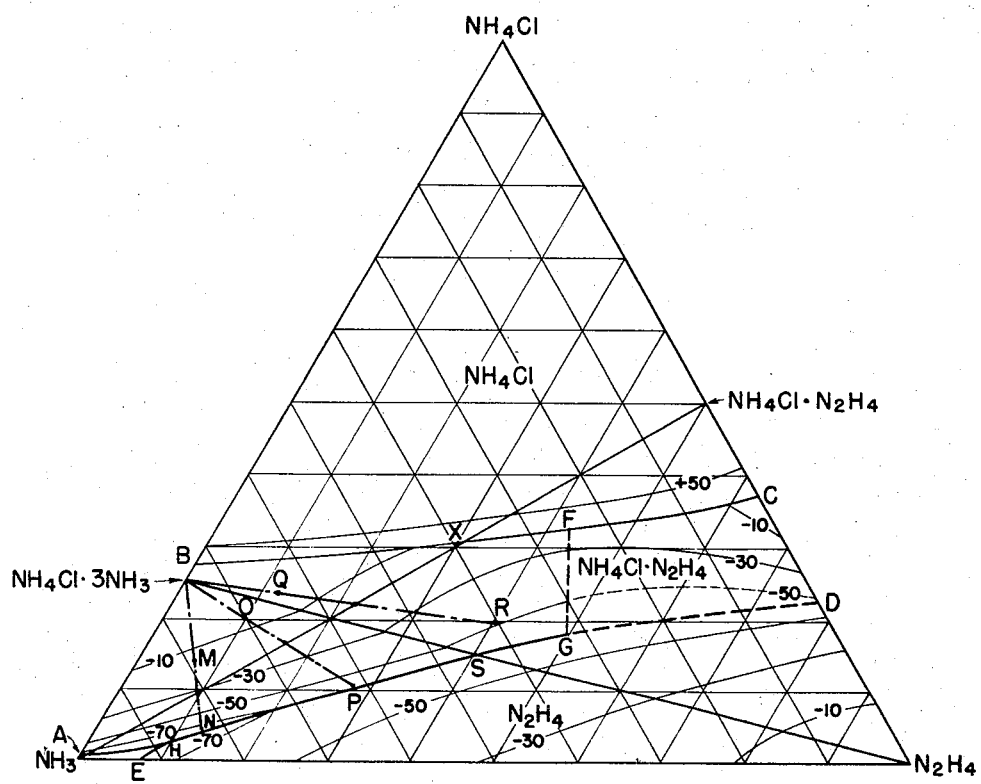
INVENTOR.
R. K. TAYLOR
BY Kenneth E. Drives
attorney

United States Patent Office 2,853,366
Patented Sept. 23, 1958

2,853,366

PROCESS OF RECOVERING HYDRAZINE FROM A LIQUID MIXTURE OF HYDRAZINE, AMMONIA AND AMMONIUM CHLORIDE

Roger K. Taylor, Baltimore, Md., assignor to W. R. Grace & Co., New York, N. Y., a corporation of Connecticut Application August 30, 1955, Serial No. 531,471

5 Claims. (Cl. 23—190)

This invention relates to the recovery of hydrazine from mixtures of hydrazine and ammonium chloride or from hydrazine hydrohalide salts. In one specific aspect, it relates to the separation of hydrazine from ammonium chloride in the presence of liquid ammonia by utilizing the solubility relationships existing for the three component system involved.

Prior art discloses a process in which chloramine and liquid ammonia are reacted under anhydrous conditions to yield hydrazine and ammonium chloride dissolved in a large excess of liquid ammonia. Hydrazine cannot be recovered from this solution by ordinary fractional distillation, since after excess ammonia has been removed, the hydrazine reacts with ammonium chloride in a 1:1 mole ratio to form hydrazine monohydrochloride. A 100% yield from the chloramine-ammonia reaction would result in this 1:1 mole ratio of hydrazine to ammonium chloride in the product. Since for yields less than this amount, the ratio of hydrazine to ammonium chloride is less than 1:1, distillation of any actual product would result in the complete conversion of the hydrazine to hydrazine monohydrochloride.

It is obvious that if removal of ammonium chloride from the system could be accomplished in a manner to increase the mole ratio of hydrazine to ammonium chloride to a value greater than 1:1, it would be possible to recover the excess hydrazine by ordinary distillation. It is known that crystals of ammonium chloride separate from solutions of liquid ammonia upon cooling. However, it is also known that, at sufficiently low temperatures, hydrazine can also crystallize from liquid ammonia. Such crystallization would preclude recovery of hydrazine from the remaining liquid phase to the extent of its occurrence. With the occurrence of extensive crystallization of hydrazine, it would be virtually impossible to obtain recoverable quantities of a solution containing a molar excess of hydrazine over the ammonium chloride present.

The present invention offers substantial improvement by defining crystallization conditions which will produce a resultant mother liquor which has a mole ratio of hydrazine to ammonium chloride substantially greater than 1:1 without the objectionable co-crystallization of hydrazine or hydrazine-containing compounds. Distillation of this mother liquor leaves behind residual hydrazine monohydrochloride in quantities equivalent to the residual ammonium chloride while the excess hydrazine is obtained in the distillate in the anhydrous form.

It is therefore an object of the present invention to recover hydrazine in its anhydrous form from its hydrohalide salts or from mixtures of hydrazine and ammonium chloride.

Conditions necessary for the recovery of hydrazine from mixtures of hydrazine and ammonium chloride dissolved in liquid ammonia will become apparent from the following description, when read in conjunction with the accompanying drawing, which is a phase diagram for the ternary ammonia-hydrazine-ammonium chloride system.

The ternary phase diagram is presented on triangular coordinates which is very convenient for representing the compositions of mixtures or solutions composed of three substances. Each corner of the composition triangle represents 100 mole percent for a particular substance. Points along the sides of the triangle represent the composition of binary mixtures formed between each pair of components of the ternary system, while points within the triangle represent compositions of ternary mixtures. The percentage of each susbtance at any point is indicated by a parallel to the side which is opposite the corner for the pure substance.

Points A and B on the diagram represent the two eutectic points in the binary system $NH_3$—$NH_4Cl$. Point C is the peritectic point and point D is the eutectic point in the binary system $N_2H_4$—$NH_4Cl$. Point E is the eutectic point in the binary system $NH_3$—$N_2H_4$. These points are points of origin for the binary eutectic lines in the ternary phase diagram because they are points at which two solid phases are in equilibrium with the liquid phase. The intersection of the binary eutectic lines BF, CF, and FG form the ternary peritectic point F. Points G and H are ternary eutectic points also formed by the intersection of three sets of binary eutectic lines. The phase areas defined by the binary eutectic lines indicate the particular solid substance which will crystallize first upon cooling the mixture. Therefore, for any known composition of a mixture of ammonia, hydrazine, and ammonium chloride, the composition point on the phase diagram predicts the solid substance which will be obtained first by cooling. A composition point represents the composition of the liquid phase for the ternary system and does not directly indicate the amount of crystallization which has occurred.

Temperature contour lines superimposed on the phase diagram indicate the temperature at which various solids will commence to crystallize. The point of intersection between a temperature contour line and a binary eutectic line indicate a temperature at which two substances will crystallize concomitantly.

The points $NH_4Cl.3NH_3$ and $N_2H_4$ are points of maximum temperature for their respective primary fields of crystallization. The quasi-binary section line which connects them may be considered as a ridge line passing through both fields of crystallization and the point S. Although the saddle point S is a maximum temperature on the binary eutectic line HG, it is at the same time the minimum temperature on the ridge line.

Any point on the line connecting the points $NH_3$ and $NH_4Cl.N_2H_4$ (which intersects the binary eutectic line BF at point X) represents a composition containing a 1:1 mole ratio of hydrazine to ammonium chloride. Any point away from this line toward the hydrazine corner represents a composition having a greater than 1:1 ratio of hydrazine to ammonium chloride.

In accordance with the present invention, the primary field of crystallization for $NH_4Cl.3NH_3$ represented by the area ABFGH on the phase diagram is of the most interest because it is in this region that the most favorable mole ratios of hydrazine to ammonium chloride are obtained for the subsequent distillation of the hydrazine from the mixture.

With the exception of ternary compositions containing a ratio of hydrazine to ammonium chloride substantially greater than 1:1, compositions located in other crystallization fields may be brought within this field by the addition of liquid ammonia to the system. The adjusted composition of a mixture so treated would lie on a line connecting the point $NH_3$ with the point of original composition and it is determined by the mole percent ammonia in the system. This adjustment procedure is desirable for compositions located within the NH₄Cl crystallization field because the mole ratio of hydrazine to ammonium chloride in the liquid phase obtained by crystalizing only ammonium chloride from such compositions would not be substantially greater than 1:1. If the mole ratio of N₂H₄/NH₄Cl in the initial composition is substantially greater than 1:1, it may be desirable to distill off the excess hydrazine and then add ammonia to achieve a resultant composition within the NH₄Cl.3NH₃ phase area. This procedure may be the preferable course of action when the initial composition is located within the N₂H₄ crystallization field. If the initial composition is located within the NH₄Cl.N₂H₄ crystallization field and if it contains a significant molar excess of hydrazine over the amount of ammonium chloride, it is also desirable to distill off the excess hydrazine. If the mole ratio of hydrazine to ammonium chloride is not sufficiently greater than 1:1, ammonia may be added to bring the composition within the phase area NH₄Cl.3NH₃.

For any ternary composition within the NH₄Cl.3NH₃ field, NH₄Cl.3NH₃ is crystallized first and the composition of the residual liquid moves in a straight line connecting the point representing the particular composition with the point NH₄Cl.3NH₃ and away from the point NH₄Cl.3NH₃.

A choice of adjusted compositions which, upon subsequent cooling, would result in an ultimate composition of the liquid phase approaching the binary eutectic lines AH and HG is preferable because such ultimate compositions have the greater hydrazine to ammonium chloride ratio. Along the binary eutectic line AH crystals of NH₄Cl.3NH₃ and NH₃ are formed simultaneously, without the formation of hydrazine-containing crystals until the ternary eutectic point H is reached. Hence, to avoid the formation of hydrazine-containing crystals, it may be desirable to select adjusted ternary compositions which would contain a liquid phase composition approaching line AH in the vicinity of point H after crystallization is stopped.

A still further limitation may be imposed by temperature considerations. Crystallization occurs at the ternary eutectic point G at a temperature of −60° C. (at atmospheric pressure) and at the ternary eutectic point H at −83° C. Limitations of equipment may necessitate initial compositions, which, upon subsequent cooling, approach the binary eutectic line HG in the vicinity of the ternary eutectic point G. The mole ratio of hydrazine to ammonium chloride decreases from 4.5:1 to 2.7:1 from point G along the binary eutectic line HG, thus making it advantageous to crystallize approaching point H from the standpoint of obtaining a greater molar excess of hydrazine over the amount of ammonium chloride in the mother liquor. At point A the crystallization temperature is −81° C. and the hydrazine to ammonium chloride ratio does not become significantly greater than 1:1 along the binary eutectic line AH until compositions are obtained which, upon cooling, approach this line near the ternary eutectic point H.

Mixtures of hydrazine and ammonium chloride in liquid ammonia obtained as a product from the process described in U. S. Patent No. 2,710,248 of Harry H. Sisler et al. contain varying proportions of hydrazine and ammonium chloride, depending upon the yield of hydrazine from the chloramine-liquid ammonia reaction. If the yield from this reaction is 100% the N₂H₄:NH₄Cl ratio would be 1:1; at 50% yield, this ratio becomes 1:2. The liquid ammonia in this product makes up about 98 mole percent of the total mixture. Evaporation of a large amount of the excess ammonia would be necessary to obtain a resultant ternary composition which after crystallization of NH₄Cl.3NH₃ would contain a significant molar excess of hydrazine over the amount of ammonium chloride and which would be adaptable to necessary temperature limitations imposed to permit efficient operation of equipment.

When a ternary mixture is cooled to a point where its liquid composition reaches a binary eutectic line, a second solid phase begins to crystallize. Specifically, when a ternary mixture having a composition located within the phase area NH₄Cl.3NH₃, which, upon cooling, would have a mother liquor of a composition approaching the binary eutectic line HG in the vicinity of the ternary eutectic point H, is cooled, the primary path of crystallization ends on the binary eutectic line HG. Upon further cooling, the liquid composition follows this binary eutectic line, while simultaneously crystallizing

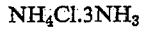

and N₂H₄, until the ternary eutectic point H is reached. The saddle point S represents the point of maximum temperature along the binary eutectic line HG. When the binary eutectic line is reached, further cooling shifts the liquid composition always along the binary eutectic line toward a ternary eutectic point in a direction away from the saddle point. At the ternary eutectic point H, further removal of heat from the mixture causes a simultaneous crystallization of NH₄.3NH₃, N₂H₄, and NH₃ in such proportions that the composition of the ternary liquid does not change throughout the crystallization period. The temperature of the liquid mixture will not change until all the liquid phase has solidified.

From the foregoing discussion, it is obvious that crystallization must be stopped before the composition of the liquid phase reaches a binary eutectic line bordering a hydrazine-containing phase area to prevent the crystallization of hydrazine. However, sufficient crystallization must occur to obtain a mother liquor composition containing a molar excess of hydrazine over the amount of ammonium chloride in order to obtain anhydrous hydrazine by distillation of this mother liquor. Such compositions of the mother liquor are represented by the area AXFGH on the drawing.

The maximum temperature at which crystallization can occur to give an incipient molar excess of hydrazine over the amount of ammonium chloride is −17° C. This temperature is obtained for a mixture having the composition located at the point of intersection of the quasi-binary section line connecting the points

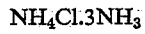

and N₂H₄ and the line connecting the points NH₃ and NH₄Cl.N₂H₄.

For efficient cryoscopic separation of ammonium chloride from hydrazine dissolved in liquid ammonia, an initial ternary mixture should be selected which, upon controlled cooling to a minimum temperature which will permit only the crystallization of NH₄Cl.3NH₃, will contain a maximum hydrazine to ammonium chloride ratio under operable conditions of temperature.

Large crystals of NH₄Cl.3NH₃ can be obtained by slowly cooling the ternary mixture to the desired crystallization temperature. Large crystals are preferable to small crystals because crystals greater in size retain a reduced amount of the mother liquor, thus facilitating the separation of the crystals and the mother liquor.

The present invention will be further illustrated by the following examples:

*Example I*

The ternary system NH₃—N₂H₄—NH₄Cl was investigated by determining the freezing point of various compositions.

A weighed amount of ammonium chloride was introduced into a freezing point cell. Anhydrous ammonia was distilled slowly from a 50 lb. cylinder of ammonia into the cell, being condensed over the ammonium chloride as the cell was cooled with a Dry Ice-trichloroethylene mixture. The amount of ammonia condensed with ammonium chloride was determined by either the difference in weight of the freezing point cell or by the freezing point of the binary mixture of ammonia and ammonium chloride. After the ammonia was added, the freezing point cell was sealed with a bottle stopper. A known quantity of hydrazine was then added stepwise and the freezing point of the mixture was determined after each addition. This procedure was repeated for 40 such ternary compositions.

For each system characterized by a fixed mole ratio of ammonia to ammonium chloride, a temperature-composition phase diagram was obtained by a plot of the freezing point of the mixture versus the mole percent $N_2H_4$ in the ternary composition.

With the use of these temperature-composition diagrams, the ternary phase diagram for the system $NH_3$—$N_2H_4$—$NH_4Cl$ shown in the accompanying drawing was prepared.

The peritectic point C and the eutectic points A, B, D, and E for the various binary systems of ammonia, ammonium chloride, and hydrazine have been well established by prior art. These points are points of origin for the binary eutectic lines on the ternary phase diagram. The direction of the binary eutectic lines was determined by plotting the points obtained from the temperature-composition diagrams. By graphically extending the binary eutectic lines to their subsequent points of intersection, the ternary peritectic and eutectic points were located. The locations of the temperature contours were also determined from the temperature-composition diagrams.

The phase areas were then designated as primary fields of crystallization for those compounds whose composition points on the ternary phase diagram fall on or near that area.

*Example II*

A ternary solution for crystallization of $NH_4Cl.3NH_3$ was prepared from solid hydrazine dihydrochloride and liquid ammonia. 225 grams of the solid were added portionwise to 700 ml. of liquid ammonia contained in a weighed 3-neck round bottom flask cooled by a Dry Ice alcohol bath. After all of the solid had been added, the flask was immediately sealed. By containing the vapor pressure of the ammonia, the mixture could be brought to room temperature so that the solid hydrazine dihydrochloride would completely dissolve. Before the flask could be removed from the pressure tank, the ammonia pressure was released. Final adjustment of the ammonia concentration was made by condensing more ammonia into the system and by evaporating ammonia slowly at the boiling point of the solution. The final weight of ammonia was determined by weighing the flask and its contents. The resultant ternary mixture contained 80.2 mole percent ammonia, 6.6 mole percent hydrazine, and 13.2 mole percent ammonium chloride. The mole ratio of hydrazine to ammonium chloride was 1:2.

Crystals of $NH_4Cl.3NH_3$ were grown from this ternary mixture by slowly cooling it to a crystallization temperature of $-77°$ C. This cooling process is represented on the drawing by the line connecting the points $NH_4Cl.3NH_3$, M, and N. Point M represents the original composition of the ternary mixture before cooling, and point N indicates the composition of the liquid phase when crystallization is stopped. Point N is nearly at the binary eutectic line HG, which would be reached at a temperature of $-79°$ C.

A mother liquor having a mole ratio of hydrazine to ammonium chloride of 3:1 was obtained. During distillation, hydrazine reacts with ammonium chloride in a mole ratio of 1:1 to form hydrazine monohydrochloride. Therefore, two-thirds of the hydrazine in the mother liquor can be recovered after a single crystallization. Distillation leaves behind hydrazine monohydrochloride, and hydrazine is obtained in the distillate in the anhydrous form. The distillation technique for the removal of the excess hydrazine is well known to those skilled in the art. In practice about 95 percent of the theoretical amount is recovered by this method.

*Example III*

In a similar method to that illustrated by Example II a ternary mixture containing 70.0 mole percent ammonia, 10.0 mole percent hydrazine and 20.0 mole percent ammonium chloride was prepared.

Crystals of $NH_4Cl.3NH_3$ were grown from this ternary mixture by slowly cooling it to a crystallization temperature of $-65°$ C. This cooling process is represented on the drawing by the line connecting the points $NH_4Cl.3NH_3$, O, and P. Point O represents the origin composition of the ternary mixtuer before cooling, and point P indicates the composition of the liquid phase when crystallization is stopped. Point P is nearly at the binary eutectic line HG, which would be reached at a temperature of $-66°$ C.

A mother liquor having a mole ratio of hydrazine to ammonium chloride of 2.6:1 was obtained. Therefore, 61.5 percent of the hydrazine in this mother liquor could be recovered by distillation after a single crystallization.

*Example IV*

In a similar method to that illustrated by Example II, a ternary mixture containing 65.0 mole percent ammonia, 11.7 mole percent hydrazine, and 23.3 mole percent ammonium chloride was prepared.

Crystals of $NH_4Cl.3NH_3$ were grown from this ternary mixture by slowly cooling it to a crystallization temperature of $-50°$ C. This cooling process is represented on the drawing by the line connecting the points $NH_4Cl.3NH_3$, Q, and R. Point Q represents original composition of the ternary mixture before cooling, and point R indicates the composition of the liquid phase when crystallization is stopped. Point R falls short of the ternary eutectic line HG, which would be reached at a temperature of $-65°$ C.

A mother liquor having a mole ratio of hydrazine to ammonium chloride of 2.2:1 was obtained. Therefore, 54.5 percent of the hydrazine in this mother liquor could be recovered by distillation after a single crystallization.

It will be noted that by the present invention, hydrazine can be efficiently recovered from mixtures of hydrazine, ammonium chloride, and liquid ammonia by physical means. After the initial distillation to separate the excess hydrazine, the ultimate recovery of hydrazine can be increased by successively redissolving the hydrazine monohydrochloride in liquid ammonia, adjusting the composition, recrystallizing, and redistilling the resultant mother liquor.

I claim:

1. A method of obtaining anhydrous hydrazine from a liquid mixture consisting essentially of hydrazine, ammonia, and ammonium chloride comprising the steps of cooling said mixture to a predetermined temperature ascertained for particular $N_2H_4$—$NH_3$—$NH_4Cl$ mixtures by correlating the freezing point of said mixture with the mole percent hydrazine contained therein to form a solid phase consisting of hydrazine-free $NH_4Cl$-containing crystals in a mother liquor in which the mole ratio of hydrazine to ammonium chloride is greater than 1:1, separating said crystals from said mother liquor, and separately recovering anhydrous hydrazine and ammonia from said mother liquor.

2. A method according to claim 1 wherein the solid phase consists essentially of the tri-ammoniate of ammonium chloride.

3. A method of obtaining anhydrous hydrazine from a liquid mixture consisting essentially of hydrazine, ammonia, and ammonium chloride comprising the steps of adjusting the concentration of ammonia in said mixture to obtain a ternary mixture which, upon cooling, forms an initial solid phase consisting of crystals of the tri-ammoniate of ammonium chloride, cooling said mixture to a predetermined temperature ascertained for particular $N_2H_4$—$NH_3$—$NH_4Cl$ mixtures by correlating the freezing point of said mixture with the mole percent hydrazine contained therein to crystallize a maximum quantity of said ammoniate of ammonium chloride without forming a second solid phase comprising $N_2H_4$-containing crystals, separating said initially formed crystals from the mother liquor and separately recovering anhydrous hydrazine, ammonia, and hydrazine monohydrochloride formed by the reaction of hydrazine and ammonium chloride therefrom.

4. In a process where chloramine and liquid ammonia are reacted under anhydrous conditions to yield hydrazine and ammonium chloride dissolved in a large excess of liquid ammonia, the method of recovering anhydrous hydrazine from the final mixture comprising removal and withdrawal of the excess ammonia present to obtain a ternary mixture which, upon cooling, forms an initial solid phase consisting of crystals of the tri-ammoniate of ammonium chloride, slowly cooling said mixture to a temperature of about —17° C. to —83° C. to form large crystals of said tri-ammoniate of ammonium chloride without forming a second solid phase comprising $N_2H_4$-containing crystals in a mother liquor in which the mole ratio of hydrazine to ammonium chloride is greater than 1:1, separating said initially formed crystals from said mother liquor, and separately recovering anhydrous hydrazine, ammonia, and hydrazine monohydrochloride formed by the reaction of hydrazine and ammonium chloride therefrom.

5. In a process where chloramine and liquid ammonia are reacted under anhydrous conditions to yield hydrazine and ammonium chloride dissolved in a large excess of liquid ammonia, the method of recovering anhydrous hydrazine from the final mixture comprising removal and withdrawal of the excess ammonia present to obtain a ternary composition having numerical values which lie within the area represented by the area ABFGH on the accompanying drawing hereinbefore described, cooling said mixture to a temperature of about —17° C. to —83° C. to form crystals of $NH_4Cl.3NH_3$ and a mother liquor having a ternary composition with numerical values which lie within the area represented by the area AXFGH on said drawing, separating said crystals from said mother liquor, and separately recovering anhydrous hydrazine, ammonia, and hydrazine monohydrochloride formed by the reaction of hydrazine and ammonium chloride therefrom.

References Cited in the file of this patent

UNITED STATES PATENTS

| | | |
|---|---|---|
| 780,448 | Shutze | Jan. 17, 1905 |
| 2,288,667 | Allen et al. | July 17, 1942 |
| 2,710,248 | Sisler et al. | June 7, 1955 |